United States Patent

Koyama

Patent Number: 5,977,211
Date of Patent: Nov. 2, 1999

[54] BALL POINT PEN FILLED WITH ERASABLE INK

[75] Inventor: Takao Koyama, Tano-gun, Japan

[73] Assignee: Mitsubishi Pencil Kabushiki Kaisha, Tokyo, Japan

[21] Appl. No.: 09/004,802

[22] Filed: Jan. 9, 1998

[30] Foreign Application Priority Data

Jan. 10, 1997 [JP] Japan ................................ 9-003259

[51] Int. Cl.⁶ .......................... C09D 11/00; C09D 11/16; C09D 11/18

[52] U.S. Cl. .................. 523/161; 106/31.64; 106/31.66; 106/31.13

[58] Field of Search ..................... 523/160, 161; 106/31.13, 31.25, 31.6, 31.62, 31.64, 31.65, 31.66

[56] References Cited

U.S. PATENT DOCUMENTS

| | | | |
|---|---|---|---|
| 3,680,462 | 8/1972 | Cronig ..................................... | 396/604 |
| 4,159,208 | 6/1979 | Hayashi et al. .......................... | 106/431 |
| 4,349,639 | 9/1982 | Muller ..................................... | 523/161 |
| 4,357,431 | 11/1982 | Murakami et al. ...................... | 523/161 |
| 4,367,966 | 1/1983 | Williams et al. ........................ | 401/190 |
| 5,372,736 | 12/1994 | Trivett ..................................... | 508/491 |
| 5,476,540 | 12/1995 | Shields et al. ........................... | 524/251 |
| 5,587,408 | 12/1996 | Burns et al. ............................. | 523/160 |
| 5,621,021 | 4/1997 | Yoshioka et al. ........................ | 523/160 |
| 5,677,067 | 10/1997 | Kojima et al. ........................ | 428/478.2 |
| 5,683,500 | 11/1997 | Kawasumi et al. ..................... | 106/31.6 |
| 5,840,883 | 11/1998 | Suzuki et al. ........................... | 536/103 |

*Primary Examiner*—Vasu Jagannathan
*Assistant Examiner*—Callie E. Shosho
*Attorney, Agent, or Firm*—Darby & Darby

[57] ABSTRACT

A ball point pen filled with an erasable ink which comprises a resin or rubber having a filming temperature of 0° C. or lower or a glass transition temperature of 0° C. or lower, pigment particles and water. The erasability and the writing feeling are improved by further blending the ink with a gelatinizer and a lubricant.

6 Claims, 1 Drawing Sheet

BALL POINT PEN FILLED WITH ERASABLE INK

BACKGROUND OF THE INVENTION

1. Field of the Invention

The present invention relates to a ball point pen filled with an erasable ink lines drawn with which can be erased with an eraser.

2. Description of the Related Art

Conventional ball point pens filled with an ink which is erasable with an eraser have been materialized by providing an ink with such very high viscosity as one million to 600 million mPa.s by using a pigment as a colorant in combination with a rubber-like material in order to make written letters erasable.

Such a method has had a disadvantage that a writing feeling is not smooth and drawn lines have a low intensity because of inferior flow of the ink.

In trying to simply solve this disadvantage, it would be considered that the viscosity of an ink is to be lowered to improve the flow of the ink. However, a reduction in the viscosity of the ink causes the ink to easily permeate into paper and brings about a disadvantage that the erasability of the written letters is notably degraded.

Accordingly, in order to solve these disadvantages, proposed is a ball point pen ink prepared by adding at least one of an inorganic compound which has a fine particle diameter and is inert to the ink component, a semi-solid material and a soft solid material having a melting point of 130° C. or lower, to an ink composition which comprises a rubber component, a volatile solvent dissolving the rubber component, a non-volatile solvent which does not dissolve the rubber component and a pigment.

In writing, this ink has such a relatively low ink viscosity that an outflow of the ink has been able to be improved much. The volatile solvent contained in the ink composition is volatilized after writing to cause the ink to reach a very high viscosity, whereby the ink is prevented from permeating into paper, and thus the ink has become erasable though not to the sufficient extent. Used as a volatile solvent are aliphatic hydrocarbons such as n-hexane, n-heptane, n-octane and isohexane, petroleum base solvents such as solvent naphtha, heavy naphtha, kerosene and ligroin, aromatic hydrocarbons such as benzene, xylene and toluene, and mixed solvents thereof. Plasticizers such as DOP, DOA and DBP are used as a main component for the non-volatile solvent. These solvents are very harmful to a human body. In general, non-polar solvents are mainly used as a solvent for this ink in order to dissolve a rubber component and have a low surface tension.

This causes a part of the ink to quickly permeate into paper before volatilizing. The ink which has once permeated can not easily be erased with an eraser. Therefore, the ink has a disadvantage that the erasability is unsatisfactory.

In addition thereto, erasable inks for a ball point pen having various compositions are proposed, but the current situation is that they have an unsatisfied erasability and desired effects have not yet come to be obtained.

SUMMARY OF THE INVENTION

An object of the present invention is to get rid of the disadvantages described above to improve an erasable ink and provide a ball point pen filled with the erasable ink which is excellent in terms of writing feeling, ink flowability, erasability and safety.

The present inventors have continued intensive researches to succeed in obtaining a ball point pen filled with an aqueous ink the viscosity of which is reduced by compounding a resin or rubber (hereinafter both shall be called "resin" all together) having a specific filming temperature or a specific glass transition temperature in the form of an emulsion or a latex, to improve in writing feeling, ink flowability, erasability and safety.

That is, the ball point pen of the present invention filled with an erasable ink is characterized by being filled with an ink comprising a resin having a filming temperature of 0° C. or lower or a glass transition temperature of 0° C. or lower, pigment particles and water. Preferably used is an ink further comprising a gelatinizer and a lubricant.

The ball point pen of the present invention filled with an erasable ink has an excellent ink-flowability since the ink is originally gelatinized but readily turned into sol by shear with a ball in writing to decrease in a viscosity. In addition, since the ink transferred onto a paper surface is easily gelatinized again, the permeability into the paper surface is suppressed, and the resin film or rubber film can readily be formed on the paper surface. The resin film or rubber film thus formed has an excellent erasability with an eraser since the film of drawn lines can readily be broken due to flexibility of the resin. Furthermore, since the matrix solvent is composed of water to be harmless, harmful volatile components are not discharged in writing lines, and hence said ink is excellent in terms of safety. In addition thereto, the ball point pen filled with an ink containing a lubricant in the form of an O/W type emulsion can write smoothly because of the lubricant.

DETAILED DESCRIPTION OF THE PREFERRED EMBODIMENT

Figure 1:
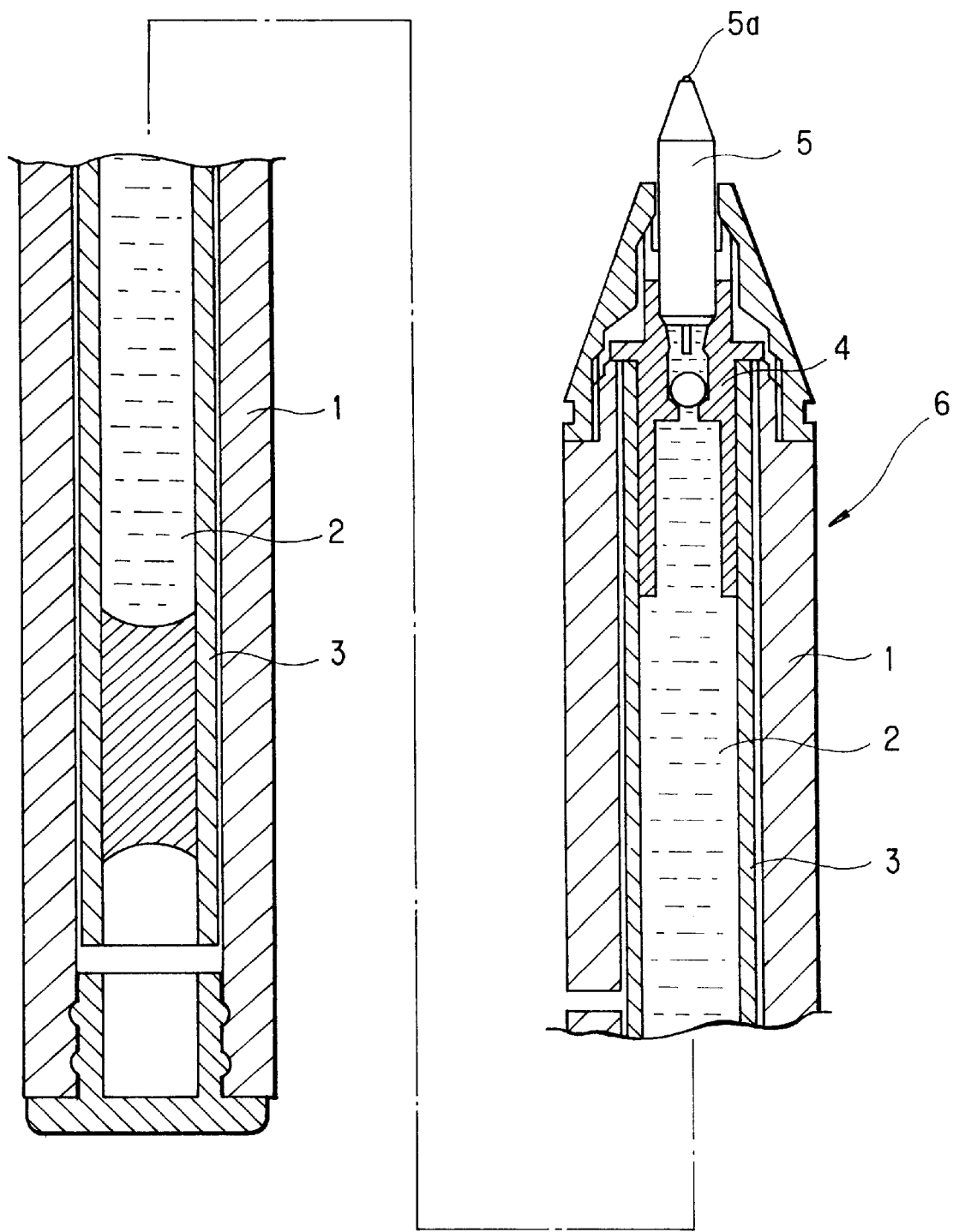
FIG. 1 is a cross section showing one example of the ball point pen of the present invention filled with an erasable ink.

The embodiment of the present invention shall be explained below in detail.

The resin used for an erasable ink which is filled into the ball point pen of the present invention (hereinafter called "the ball point pen of the present invention") has a filming temperature of 0° C. or lower or a glass transition temperature of 0° C. or lower.

If the resin having a filming temperature exceeding 0° C. or a glass transition temperature exceeding 0° C. is used, the resin film of the written lines is hard and fragile, and therefore when erasing with an eraser, it is difficult to break the resin film of the written lines. Furthermore, if the resin film is rubbed to break, the resin containing a pigment remains between the fibers of paper, and therefore satisfactory erasability can not be obtained.

An amount of the resin used in the ink falls in a range of 2 to 50% by weight, preferably 20 to 30% by weight based on the ink composition. If the amount of the resin is less than 2% by weight, the erasability of the ink can not be exerted, and if the amount of the resin exceeds 50% by weight, spinning following filming of the resin is liable to take place during writing. Accordingly, such ranges are not practical.

Specific resin are selected from those shown below, and they are used alone or in combination of two or more kinds thereof. They include, for example, rubber-like materials such as natural rubber, styrene-butadiene rubber, chloroprene rubber, nitrile rubber which is a copolymer of acrylonitrile and butadiene, butyl rubber which is a copolymer of isobutylene and isoprene, cis-1,4-polyisoprene, rubber-like polymers (acryl rubbers) of various esters of acrylic acid, polysulfide rubber, ethylene-propylene rubber and urethane rubber; acrylonitrile base copolymers such as styrene-acrylonitrile copolymers, acrylonitrile-butadiene-styrene ternary copolymers and acrylonitrile-vinylidene chloride copolymers; vinyl chloride polymers such as vinyl chloride base polymers and vinylidene chloride base polymers; vinyl acetate base polymers such as vinyl acetate polymers, vinyl acetate-ethylene polymers, vinyl acetate-ethylene-vinyl chloride polymers and vinyl acetate-maleate polymers; and polyolefins such as polybutene and polyethylene.

To explain the resin used for the ink in the present invention in further detail, preferred are the above-mentioned resins which can be used in the form of an emulsion or a latex of a polymer together with water. They include, for example, styrene-butadiene latex (SBR), acrylonitrile-butadiene latex (NBR), vinylpyridine copolymer latex (VP), methyl methacrylate-butadiene latex (MBR, ABR), acrylate latex (AR), chloroprene latex (CR), isoprene latex (IR), butyl latex (IIR), thiocol latex, urethane latex and natural rubber latex (NR).

Emulsifiers constituting these latices and emulsions are preferably nonionic surfactants or anionic surfactants.

The emulsifiers include, for example, those obtained by mixing at least one of surfactants selected from nonionic surfactants such as sorbitan fatty esters, glycerin fatty esters, decaglycerin fatty esters, polyglycerin fatty esters, polyethylene sorbitan fatty esters, polyoxyethylene sorbit fatty esters, polyoxyethylene glycerin fatty esters, polyethylene glycol fatty esters, polyoxyethylene alkyl ethers, polyoxyethylene polyoxypropylene alkyl ethers, polyoxyethylene alkylphenyl ethers, polyoxyethylene castor oil, polyoxyethylenelanolin•lanolin•alcohol beeswax derivatives and polyoxyethylenealkylamine•fatty amide, and anionic surfactants such as alkylsulfates, polyoxyethylene alkyl ether sulfates, N-acylamino acid salts, N-acylmethyltaurine salts, polyoxyethylene alkyl ether acetates, α-olefinsulfonates, alkylphosphates and polyoxyethylene alkyl ether phosphates.

It is preferable to add a gelatinizer to the ink used for the ball point pen of the present invention. Blending of the gelatinizer can control the permeation of the ink into paper and further enhance the erasability with an eraser.

The gelatinizer includes, for example, natural resins and water soluble polymers comprising synthetic polymers, such as polysaccharides, cellulose derivatives, starch derivatives, acrylic resins, acrylonitrile resins and polyalkylene glycols. They are used alone or in a mixture of two or more kinds thereof.

To be specific, they include carrageenan, pectic acid, pectinic acid, arginic acid, proteoglycan, glycoprotein, gellan gum, agarose, curdlan, guar gum, xanthane gum, polyvinyl alcohol, a mixture of polyvinyl alcohol and polyacrylic acid, a mixture of polyvinyl alcohol, polyacrylic acid and polyallylamine, a mixture of polymethacrylic acid and polyethylene glycol, a mixture of polyvinylbenzyltrimethylammonium chloride (PVBMA) and poly(sodium methacrylate), a mixture of polyvinylbenzyltrimethylammonium chloride (PVBMA) and poly(sodium styrenesulfonate), and mixtures of alkali metal salts and alkaline earth metal salts of polycarboxylic acid and polystyrenesulfonic acid.

An amount of the gelatinizer used in the ink falls in a range of 0 to 20% by weight, preferably 0.2 to 5% by weight.

The amount of this gelatinizer exceeding 20% by weight makes it impossible to turn the ink into sol in writing, so that the ink deteriorates in the flowability and can not sufficiently flow out. Accordingly, such amount is not preferred.

It is preferable to add a lubricant to the ink used for the ball point pen of the present invention. Blending of the lubricant smoothens the rotation of the ball of the ball point pen and can enhance the writing feeling.

The lubricant used for the ink for the ball point pen of the present invention is in the condition of an O/W type emulsion, and oils which can be turned into an O/W type emulsion, such as fatty acids, higher alcohols, hydrocarbon oils, fats & oils and synthetic lubricants can be used.

To be specific, included are fatty acids such as oleic acid, stearic acid and linoleic acid; fats & oils such as coconut oil, olive oil, castor oil and beef tallow; higher alcohols such as oleyl alcohol, isostearyl alcohol and cetyl alcohol; and hydrocarbon oils such as mineral oils, squalane, polybutene and liquid paraffin.

The emulsifier forming the O/W type emulsion in the lubricant includes at least one selected from nonionic surfactants such as sorbitan fatty esters, glycerin fatty esters, decaglycerin fatty esters, polyglycerin fatty esters, polyoxyethylene sorbitan fatty esters, polyoxyethylene sorbit fatty esters, polyoxyethylene glycerin fatty esters, polyethylene glycol fatty esters, polyoxyethylene alkyl ethers, polyoxyethylene polyoxypropylene alkyl ethers, polyoxyethylene alkylphenyl ethers, polyoxyethylene castor oil, polyoxyethylenelanolin•lanolin alcohol•beeswax derivatives and polyoxyethylene alkylamine•fatty amide, and anionic surfactants such as alkylsulfates, polyoxyethylene alkyl ether sulfates, N-acylamino acid salts, N-acylmethyltaurine salts, polyoxyethylene alkyl ether acetates, a-olefinsulfonates, alkylphosphates and polyoxyethylene alkyl ether phosphates.

An amount of the oil blended in the lubricant falls in a range of 0 to 10% by weight, preferably 1 to 5% by weight based on the weight of the ink composition. An amount of the emulsifier constituting the O/W type emulsion in the lubricant is determined by the amount of the oil and falls in a range of 0.1 to 200% by weight, preferably 1 to 100% by weight based on the amount of the blended oil.

Conventional pigments usually used in inks for writing tools can be used for pigment particles used for the ink for the ball point pen of the present invention. Preferably the pigment particles have a particle diameter of 10 μm or less.

The particle diameter of the pigment particle exceeding 10 μm results in the larger diameter of the pigment particles than a gap between the ball and the ball bearer of the ball point pen tip, which brings about the inconvenience that the outflow of the ink is physically prevented.

To show the examples of the usable pigments by color index (C. I.) number, used are pigment black 6, 7, 9, 10 and 11, pigment red 101, 105, 106, 107 and 108, pigment blue 27, 28, 29 and 35, pigment green 17, 18, 19 and 21, pigment white 6 and pigment yellow 42 as inorganic pigments, and pigment black 1, pigment red 1, 2, 3, 4, 5, 6, 7, 9, 12 and 22, pigment violet 19, pigment blue 1, 2, 15, 15:3, 15:4, 16 and 17, pigment green 2, 7, 8 and 10, and pigment yellow 1 and 3 as organic pigments. To be specific, included are titanium oxide, yellow iron oxide, red iron oxide, carbon black, quinacridone red, monoazo yellow and phthalocyanine blue.

An amount of the blended pigment particles falls in a range of 1 to 50% by weight, preferably 3 to 30% by weight based on the weight of the ink composition.

An amount of water blended in the ink for the ball point pen of the present invention falls in a range of 15 to 98% by weight based on the weight of the ink composition, and ion-exchanged water and distilled water are used. In any case, it is preferable to make a suitable blend composition, considering the mechanism of the ball point pen and the desired intensity of drawn lines.

The ink for the ball point pen of the present invention may further be blended, if necessary, with other additives usually used for ink compositions for writing tools in addition to the components described above, for example, fungicides, pH controllers, and water soluble organic solvents such as ethylene glycol, diethylene glycol, polyalkylene glycol, propylene glycol and glycerin as organic solvents.

The ball point pen of the present invention is filled with the ink comprising the components described above and other additives usually used for ink compositions for writing tools, but the structure and the shape of the ball point pen itself shall by no means be restricted.

As shown in FIG. 1, included is, for example, a ball point pen 6 having an ink reservoir 3 filled with an erasable ink 2 in a barrel 1, wherein the ink reservoir 3 is connected to a tip 5 equipped with a ball 5a via an ink back-flow prevention mechanism 4 comprising a ball valve.

Preferably the ball point pen has a ball of a diameter of 0.3 to 2.0 mm. The ball point pen using a ball of a diameter falling in this range can provide much better writing feeling and ink flowability.

The reason why the ball point pen of the present invention has a good erasability is that the interaction of the flexibility of the resin having a glass transition temperature of 0° C. or lower with the ink being in a gelatinized condition by virtue of the gelatinizer makes it difficult to cause the ink to permeate into a paper surface, so that the film of the resin can be readily formed on the paper surface without causing the ink to permeate into the paper surface and can be easily broken.

Furthermore, since the matrix solvent is composed of water to be harmless, harmful volatile components are not discharged in drawing lines, and therefore the ball point pen of the present invention is excellent in safety. In addition, blending of the lubricant in an emulsion condition reduces the abrasion of the tip and makes it possible to use the ball point pen without feeling much resistance when writing lines.

EXAMPLES

The ball point pen of the present invention filled with an erasable ink shall be explained below in further detail with reference to examples, but the present invention shall not be restricted to these examples.

Example 1

The following components were blended to obtain an erasable ink filled into the ball point pen of the present invention.

Resin:

styrene-butadiene base latex 14.40 parts by weight
(manufactured by Nippon Zeon Co., Ltd.: brand name "Nipol LX110", glass transition temperature: −50° C., solid content: 40.5%)

styrene-butadiene base latex 7.20 parts by weight
(manufactured by Nippon Zeon Co., Ltd.: brand name "Nipol 2570×5", glass transition temperature: −20° C., solid content: 41%)

Lubricant:

oleic acid 0.95 part by weight polyglycerin polyricinolate 0.05 part by weight
(manufactured by Sakamoto Yakuhin Ind. Co., Ltd., brand name: "CR-310")

Pigment particles:

carbon black 1.68 part by weight
(manufactured by Mitsubishi Chemical Co., Ltd., brand name: "MCF-88", average particle diameter: 15 $\mu$m)

Surfactant:

polyoxyethylene oleyl ether 0.01 part by weight
(manufactured by Nikko Chemicals Co., Ltd., brand name: "BO-10TX")

Gelatinizer:

mixture of xanthane gum and 0.50 part by weight
locust bean gum

Solvent:

polyoxyethylene glycol 0.56 part by weight

Water (ion-exchanged water): 7.21 parts by weight

In preparing this erasable ink for the ball point pen, the styrene-butadiene base latices described above were mixed in the prescribed amounts, and the lubricant obtained by blending oleic acid homogeneously with polyglycerin polyricinolate was added thereto, followed by stirring at a high speed by means of a high speed disperser, whereby an ink component A was obtained. Next, carbon black, the surfactant, the solvent and water were mixed and stirred, and then dispersed by means of a DYNO mill to thereby obtain an ink component B. The ink components A and B thus obtained were mixed in the prescribed amounts and stirred again at a high speed, whereby an ink component C was obtained. The prescribed amount of the gelatinizer was added to the resulting ink component C and dissolved sufficiently homogeneously while being stirred at a low speed, whereby the erasable ink for the ball point pen was obtained.

Example 2

The following components were blended to obtain an erasable ink filled into the ball point pen of the present invention.

Resin:

styrene-butadiene base latex 14.40 parts by weight
(manufactured by Nippon Zeon Co., Ltd.: brand name "Nipol LX110", glass transition temperature: −50° C., solid content: 40.5%)

styrene-butadiene base latex 7.20 parts by weight
(manufactured by Nippon Zeon Co., Ltd.: brand name "Nipol 2570×5", glass transition temperature: −20° C., solid content: 41%)

Lubricant:

oleic acid 0.95 part by weight polyglycerin polyricinolate 0.05 part by weight
(manufactured by Sakamoto Yakuhin Ind. Co., Ltd., brand name: "CR-310")

Pigment particles:

phthalocyanine blue 4.00 parts by weight
(manufactured by Dainichiseika Color & Chemical Mfg. Co., Ltd., brand name: "Chromofine Blue 4920", average particle diameter: 0.1 $\mu$m)

Surfactant:

polyoxyethylene oleyl ether 0.01 part by weight
(manufactured by Nikko Chemicals Co., Ltd., brand name: "BO-10TX")

Gelatinizer:

Carrageenan 0.50 part by weight

Solvent:

ethylene glycol 0.56 part by weight

Water (ion-exchanged water): 7.21 parts by weight

In preparing this erasable ink for the ball point pen, the styrene-butadiene base latices described above were mixed in the prescribed amounts, and the lubricant obtained by blending oleic acid homogeneously with polyglycerin polyricinolate was added thereto, followed by stirring at a high speed by means of the high speed disperser, whereby an ink component D was obtained. Next, phthalocyanine blue, the surfactant, the solvent and water were mixed and stirred and then dispersed by means of the DYNO mill to thereby obtain an ink component E. The ink components D and E thus obtained were mixed in the prescribed amounts and stirred again at a high speed, whereby an ink component F was obtained. The prescribed amount of the gelatinizer was added to the resulting ink component F and dissolved sufficiently homogeneously while being stirred at a low speed, whereby the erasable ink for the ball point pen was obtained.

Example 3

The following components were blended to obtain an erasable ink filled into the ball point pen of the present invention.

Resin:

styrene-butadiene base latex 14.40 parts by weight (manufactured by Nippon Zeon Co., Ltd.: brand name "Nipol LX110", glass transition temperature: −50° C., solid content: 40.5%)

styrene-butadiene base latex 7.20 parts by weight (manufactured by Nippon Zeon Co., Ltd.: brand name "Nipol 2570×5", glass transition temperature: −20° C., solid content: 41%)

Lubricant:

oleic acid 0.95 part by weight polyglycerin polyricinolate 0.05 part by weight (manufactured by Sakamoto Yakuhin Ind. Co., Ltd., brand name: "CR-310")

Pigment particles:

quinacridone red 1.68 part by weight (manufactured by Dainippon Ink and Chemicals Inc., brand name: "Fastogen Super Red BN", average particle diameter: 0.2 $\mu$m)

Surfactant:

polyoxyethylene oleyl ether 0.01 part by weight (manufactured by Nikko Chemicals Co., Ltd., brand name: "BO-10TX")

Gelatinizer:

mixture of xanthane gum and 0.50 part by weight locust bean gum

Solvent:

polyoxyethylene glycol 0.56 part by weight

Water (ion-exchanged water): 7.21 parts by weight

In preparing this erasable ink for the ball point pen, the styrene-butadiene base latices described above were mixed in the prescribed amounts, and the lubricant obtained by blending oleic acid homogeneously with polyglycerin polyricinolate was added thereto, followed by stirring at a high speed by means of the high speed disperser, whereby an ink component G was obtained. Next, quinacridone red, the surfactant, the solvent and water were mixed and stirred and then dispersed by means of the DYNO mill to thereby obtain an ink component H. The ink components G and H thus obtained were mixed in the prescribed amounts and stirred again at a high speed, whereby an ink component I was obtained. The prescribed amount of the gelatinizer was added to the resulting ink component I and dissolved sufficiently homogeneously while being stirred at a low speed, whereby the erasable ink for the ball point pen was obtained.

Example 4

The following components were blended in the same manner as in Example 1 to obtain an erasable ink filled into the ball point pen of the present invention, except that the lubricant was not used.

Resin:

styrene-butadiene base latex 14.40 parts by weight (manufactured by Nippon Zeon Co., Ltd.: brand name "Nipol LX110", glass transition temperature: −50° C., solid content: 40.5%)

styrene-butadiene base latex 7.20 parts by weight (manufactured by Nippon Zeon Co., Ltd.: brand name "Nipol 2570×5", glass transition temperature: −20° C., solid content: 41%)

Pigment particles:

carbon black 1.68 part by weight (manufactured by Mitsubishi Chemical Co., Ltd., brand name: "MCF-88", average particle diameter: 15 $\mu$m)

Surfactant:

polyoxyethylene oleyl ether 0.01 part by weight (manufactured by Nikko Chemicals Co., Ltd., brand name: "BO-10TX")

Gelatinizer:

mixture of xanthane gum and 0.50 part by weight locust bean gum

Solvent:

polyoxyethylene glycol 0.56 part by weight

Water (ion-exchanged water): 7.21 parts by weight

Example 5

The following components were blended in the same manner as in Example 1 to obtain an erasable ink filled into the ball point pen of the present invention, except that the gelatinizer was not used.

Resin:

styrene-butadiene base latex 14.40 parts by weight (manufactured by Nippon Zeon Co., Ltd.: brand name "Nipol LX110", glass transition temperature: −50° C., solid content: 40.5%)

styrene-butadiene base latex 7.20 parts by weight (manufactured by Nippon Zeon Co., Ltd.: brand name "Nipol 2570×5", glass transition temperature: −20° C., solid content: 41%)

Lubricant:

oleic acid 0.95 part by weight polyglycerin polyricinolate 0.05 part by weight (manufactured by Sakamoto Yakuhin Ind. Co., Ltd., brand name: "CR-310")

Pigment particles:

carbon black 1.68 part by weight (manufactured by Mitsubishi Chemical Co., Ltd., brand name: "MCF-88", average particle diameter: 15 $\mu$m)

Surfactant:

polyoxyethylene oleyl ether 0.01 part by weight (manufactured by Nikko Chemicals Co., Ltd., brand name: "BO-10TX")

Solvent:

polyoxyethylene glycol 0.56 part by weight

Water (ion-exchanged water): 7.21 parts by weight

Example 6

The following components were blended in the same manner as in Example 1 to obtain an erasable ink filled into the ball point pen of the present invention, except that the lubricant and the gelatinizer were not used.

Resin:

styrene-butadiene base latex 14.40 parts by weight (manufactured by Nippon Zeon Co., Ltd.: brand name "Nipol LX110", glass transition temperature: −50° C., solid content: 40.5%)

styrene-butadiene base latex 7.20 parts by weight (manufactured by Nippon Zeon Co., Ltd.: brand name "Nipol 2570×5", glass transition temperature: −20° C., solid content: 41%)

Pigment particles:

carbon black 1.68 part by weight (manufactured by Mitsubishi Chemical Co., Ltd., brand name: "MCF-88", average particle diameter: 15 $\mu$m)

Surfactant:

polyoxyethylene oleyl ether 0.01 part by weight (manufactured by Nikko Chemicals Co., Ltd., brand name: "BO-10TX")

Solvent:

polyoxyethylene glycol 0.56 part by weight

Water (ion-exchanged water): 7.21 parts by weight

The inks obtained in Examples 1 to 6 described above were filled respectively into ball point pens (UM100 manufactured by Mitsubishi Pencil Co., Ltd., ball diameter: 0.5 mm, refer to FIG. 1) to obtain the ball point pens each filled with the erasable inks.

When writing was carried out on a paper surface with the ball point pens prepared in Examples 1 to 3, drawn lines having a satisfactory drawn line intensity were obtained with a smooth feeling of writing. The drawn lines thus obtained were rubbed with an eraser to find that the good erasability with an eraser was shown. Slightly deteriorated were smooth feeling of writing with the ball point pen in Example 4, the erasability with an eraser in Example 5 and smooth feeling of writing as well as the erasability with an eraser in Example 6, but they were all sufficiently practicable.

What is claimed is:

1. A ball point pen filled with an erasable ink, wherein said erasable ink comprises a resin having a filming temperature of 0° C. or lower or a glass transition temperature of 0° C. or lower, a lubricant in the form of an O/W type emulsion, a gelatinizer, pigment particles and water.

2. The ball point pen filled with an erasable ink as described in claim 1, wherein the resin is in the form of an emulsion or latex, being selected from natural rubber, styrene-butadiene rubber, chloroprene rubber, nitrile rubber which is a copolymer of acrylonitrile and butadiene, butyl rubber which is a copolymer of isobutylene and isoprene, cis-1,4-polyisoprene, rubber polymers of acrylic esters, polysulfide rubber, ethylene-propylene rubber, urethane rubber, styrene-acrylonitrile copolymers, acrylonitrile-butadiene-styrene ternary copolymers, acrylonitrile-vinylidene chloride copolymers, vinyl chloride base polymers, vinylidene chloride base polymers, vinyl acetate polymers, vinyl acetate-ethylene polymers, vinyl acetate-ethylene-vinyl chloride polymers, vinyl acetate-maleate polymers, polybutene and polyethylene.

3. The ball point pen filled with an erasable ink as described in claim 2, wherein the gelatinizer is a water soluble polymer comprising polysaccharides, cellulose derivatives, starch derivatives, acrylic resins, acrylonitrile resins, polyalkylene glycols.

4. The ball point pen filled with an erasable ink as described in claim 2, wherein oil constituting an O/W type emulsion in the lubricant is at least one oil which can be emulsified in O/W type and is selected from fatty acids, higher alcohols, hydrocarbon oils, fats & oils and synthetic lubricants.

5. The ball point pen filled with an erasable ink as described in claim 1, wherein the gelatinizer is a water soluble polymer comprising polysaccharides, cellulose derivatives, starch derivatives, acrylic resins, acrylonitrile resins, polyalkylene glycols.

6. The ball point pen filled with an erasable ink as described in claim 1, wherein oil constituting an O/W type emulsion in the lubricant is at least one oil which can be emulsified in O/W type and is selected from fatty acids, higher alcohols, hydrocarbon oils, fats & oils and synthetic lubricants.

* * * * *